March 22, 1927.
J. A. BEODDY
1,621,867
TESTING JACK
Filed March 5, 1924
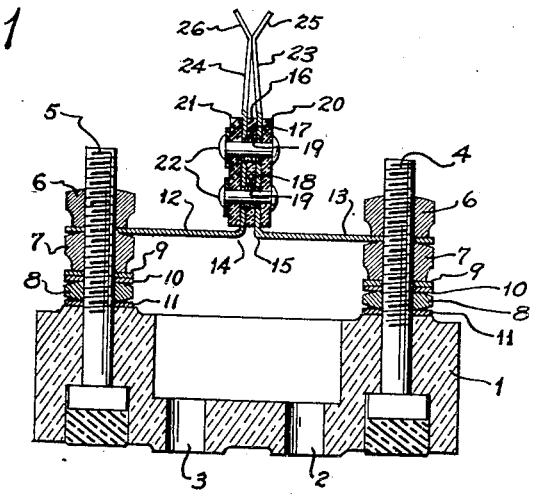
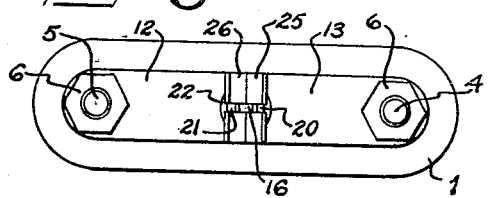
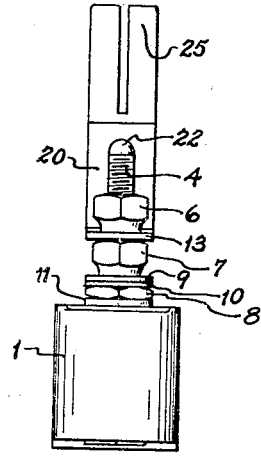
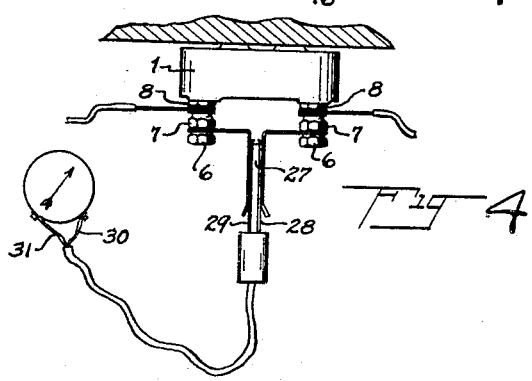
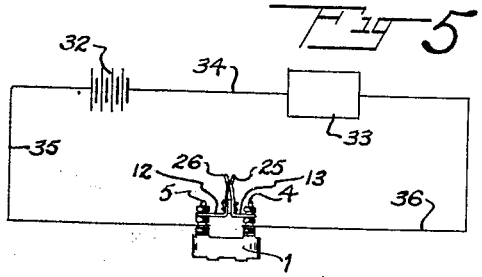
INVENTOR
John A. Beoddy
BY
Lyman E. Dodge
ATTORNEY Patented Mar. 22, 1927.

1,621,867

UNITED STATES PATENT OFFICE.

JOHN A. BEODDY, OF ROANOKE, VIRGINIA.

TESTING JACK.

Application filed March 5, 1924. Serial No. 696,967.

This invention relates to a testing jack, more particularly to a testing jack useful in connection with railway signalling appliances.

The principal object of this invention is to provide a device which will provide a means whereby the integrity of a railway signalling circuit may be tested without opening the circuit of the railway signalling device the circuit through which it is desired to ascertain the integrity of.

Other objects and advantages will appear as the description of the particular physical embodiment selected to illustrate the invention progresses, and the novel features of the invention will be particularly pointed out in the appended claim.

In describing the invention in detail, and the particular physical embodiment selected to illustrate the invention, reference is had to the accompanying drawing, wherein I have illustrated a particular preferred physical embodiment of my invention, and wherein like characters of reference designate corresponding parts throughout the several views, and in which:

Figure 1, is a cross sectional elevation of a device embodying my invention; Fig. 2, is an end elevation of the device as shown by Fig. 1; Fig. 3, is a top plan view of the device as shown by Fig. 1; Fig. 4, is a fragmentary view illustrating the connection of a testing instrument to my improved jack; Fig. 5 is a schematic view illustrating the connection of my improved jack in an operating circuit.

Those skilled in railway signalling are aware that the different wires coming into an instrument case or relay box are generally first connected to one side of what is known as a junction block, the other side of the junction block being connected to the signal mechanism or the relay or whatever instrument may happen to be in the instrument case or relay box. These junction blocks are practically standard, that is, not only is their use practically universal but the dimensions of junction blocks made by different manufacture are substantially the same. These junction blocks consist essentially of a porcelain base with two binding posts attached thereto, one of which receives the incoming wire, the other which receives the wire going to the instrument and both being connected by a strap to complete the circuit.

In railway signalling it is frequently necessary to test the integrity of the circuits connecting the instrumentalities. In order to do this, it is very often necessary to insert an instrument in the circuit which goes through the junction block and to do this it is necessary to first break the circuit and then connect the circuit through the testing instrument. This is highly objectionable as is well understood by those familiar with railway signalling as by this act what are known as track relays are often deenergized, thus resulting in a change of signal indication. In order to avoid the difficulty inherent in any device for testing which necessitates breaking the circuit, applicant has devised the improved jack especially adapted for use in connection with railway signalling circuits.

In the drawings numeral 1 designates the junction block base, generally made of porcelain. It has two orifices 2 and 3 through which suitable fastening means are passed to hold the junction block in the desired place. At each of the ends of the junction block is a binding screw or post as 4 and 5. On each of the binding posts as 4 and 5 are positioned a variety of binding nuts as 6, 7 and 8 and washers as 9, 10 and 11. These binding nuts and washers, as is well understood, are for the purpose of furnishing a ready and convenient means of attaching one end of a wire to each of the posts, one wire being an outside wire and the other being an inside wire going to an instrument. These posts as 4 and 5 must be electrically connected in the usual circuit by some form of strip.

Applicant takes advantage of the present construction and substitutes for the strip connected the posts 4 and 5, a means for normally maintaining the circuit intact and for inserting a testing instrument in the circuit without breaking the circuit.

Applicant's improved jack includes a member 12 and a member 13. These members 12 and 13 may be of any suitable or appropriate material but they must be conductors of electricity and must be made of such material that they will have what may be called a spring action, that is, as will later appear, their ends are brought together to make an electrical contact and the material must be such that when allowed to do so they will strongly contact each other. I have found phospher bronze to be a most suitable material for these members 12 and 13.

The members 12 and 13 are preferably bent at approximately a right angle at the points 15 so that each of the members 12 and 13 is formed into a member having two legs. One leg is connected firmly to a binding post. The other leg as shown in Fig. 1 extends upwardly adjacent to a leg of the other member. The two upstanding legs of the members 12 and 13 are separated by an insulating strip 16. This strip is formed with orifices therein as 17 and 18 for the reception of insulating thimbles as 19. On the side of each of the legs remote from the strip 16 are positioned insulating strips as 20 and 21 and all of the strips both insulating and metallic are firmly, rigidly and fixedly held together by means of rivets as 22, the metallic strips having orifices formed therein through which the insulating thimbles 17 and 18 pass to protect the strips from contact with the metallic rivets 22.

Above the clamping means by which the strips are clamped together the strips 12 and 13 are bent slightly inwardly as at 23 and 24 so that they come to a mutual contact and are then flared outwardly as at 25 and 26 forming jaws for a testing instrument.

The strips 12 and 13 being made of resilient or spring material and the jaws 25 and 26 being formed therein a wedge shaped member may be forced therebetween. Such a wedge shaped member is shown in Fig. 4 at 27, having on one side a metallic strip 28 and on the other side a metallic strip 29, the strips being separated by the member 27 which is of insulating material. It can be readily seen that if the member 27 is forced between the jaws 25 and 26 that the metallic strips 28 and 29, joined to the wires 30 and 31 going into the testing instrument, that the circuit from post 4 to post 5 will not be broken by the insertion of member 27 between the jaws 25 and 26 because it will be made through the testing instrument even after the jaws have been separated.

In Fig. 5, I have illustrated a battery as 32 joined to a relay shown as a rectangle 33 and have shown the battery 32 and the relay 33 connected by a wire 34, the other end of the battery being connected by a wire as 35 to one post 5 of a terminal of a junction block, the other post of which 4 is connected by wire 36 to the other side of the relay 33. This sketch illustrates in principle how applicant's improved jack would be connected in a railway signalling circuit and it can be seen that the integrity of the circuit comprising the battery 32, the relay 33 and the wires 34 and 35 and 36 could be tested by inserting the member 27 between the jaws 25 and 26 without de-energizing the relay 33.

Although I have particularly described the construction of one physical embodiment of my invention, and explained the operation and principle thereof; nevertheless, I desire to have it understood that the form selected is merely illustrative, but does not exhaust the possible physical embodiment of the idea of means underlying my invention.

What I claim as new and desire to secure by Letters Patent of the United States, is:

In a testing jack, an insulating support, a pair of spaced binding posts thereon, each of said binding posts having means for securing electrical conductors, a pair of conductor strips each secured to a respective binding post and each consisting of a free portion extending toward the opposite binding post and an outwardly directed resilient bowed portion substantially at right angles to the first portion, said first portions being alined and spaced from each other at their inner ends, said bowed portions contacting adjacent their ends to form the jaws of the jack, and an insulating block between the bowed portions adjacent the inner ends of the first portions and having the bowed portions secured thereto.

JOHN A. BEODDY.